(12) United States Patent
Schmidt

(10) Patent No.: US 7,023,649 B2
(45) Date of Patent: *Apr. 4, 2006

(54) DEVICES AND SYSTEMS FOR SETTING END-OF-SEEK CRITERIA FOR ROTATABLE STORAGE MEDIA

(75) Inventor: Thorsten Schmidt, Milpitas, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 55 days.

This patent is subject to a terminal disclaimer.

(21) Appl. No.: 10/369,914

(22) Filed: Feb. 18, 2003

(65) Prior Publication Data

US 2004/0125495 A1    Jul. 1, 2004

Related U.S. Application Data

(60) Provisional application No. 60/437,280, filed on Dec. 30, 2002, provisional application No. 60/437,456, filed on Dec. 30, 2002, provisional application No. 60/437,207, filed on Dec. 30, 2002, provisional application No. 60/437,383, filed on Dec. 30, 2002.

(51) Int. Cl.
*G11B 5/09* (2006.01)
*G11B 5/965* (2006.01)
*G11B 21/02* (2006.01)

(52) U.S. Cl. .................. 360/77.08; 360/53; 360/75
(58) Field of Classification Search ............... 360/53, 360/31, 75, 77.08, 69, 77.11, 77.01, 78.01, 360/78.04, 78.05, 78.09; 369/30.16

See application file for complete search history.

(56) References Cited

U.S. PATENT DOCUMENTS

| | | | | |
|---|---|---|---|---|
| 6,031,683 | A * | 2/2000 | Iverson et al. | 360/78.04 |
| 6,101,065 | A * | 8/2000 | Alfred et al. | 360/78.04 |
| 6,195,222 | B1 * | 2/2001 | Heminger et al. | 360/78.07 |
| 6,292,320 | B1 * | 9/2001 | Mason et al. | 360/63 |
| 6,507,451 | B1 * | 1/2003 | Sugimoto | 360/78.07 |
| 6,687,078 | B1 * | 2/2004 | Kim | 360/77.04 |
| 6,795,262 | B1 * | 9/2004 | Codilian et al. | 360/60 |
| 6,848,019 | B1 * | 1/2005 | Mobley et al. | 711/111 |

* cited by examiner

*Primary Examiner*—A. M. Psitos
*Assistant Examiner*—Adam R. Giesy
(74) *Attorney, Agent, or Firm*—Fliesler Meyer LLP

(57) ABSTRACT

In order to increase the performance and reliability of devices including rotatable storage media, individual characteristics of device elements or heads can be determined and used to set performance criteria. The off-track capability and track mis-registration of an element or head can be determined and used to set individualized end-of-seek criteria for elements or heads of devices including rotatable storage media.

30 Claims, 13 Drawing Sheets

DISK 200

DEVICES AND SYSTEMS FOR SETTING END-OF-SEEK CRITERIA FOR ROTATABLE STORAGE MEDIA

PRIORITY CLAIM

This application claims priority to the following U.S. Provisional Patent Applications, incorporated herein by reference:

U.S. Provisional Patent Application No. 60/437,280, "Devices and Systems for Setting Thresholds for Rotatable Storage Media" by Thorsten Schmidt, filed Dec. 30, 2002.

U.S. Provisional Patent Application No. 60/437,456, entitled "Devices and Systems for Setting End-Of-Seek Criteria for Rotatable Storage Media," by Thorsten Schmidt, filed Dec. 30, 2002.

U.S. Provisional Patent Application No. 60/437,207, entitled "Methods for Setting End-Of-Seek Criteria for Rotatable Storage Media," by Thorsten Schmidt, filed Dec. 30, 2002.

U.S. Provisional Patent Application No. 60/437,383, entitled "Methods for Setting Thresholds for Rotatable Storage Media," by Thorsten Schmidt, filed Dec. 30, 2002.

CROSS-REFERENCED CASES

The following applications are cross-referenced and incorporated herein by reference:

U.S. patent application Ser. No. 10/369,936, entitled "Methods for Setting Thresholds for Rotatable Storage Media," by Thorsten Schmidt, filed Feb. 18, 2003.

U.S. patent application Ser. No. 10/369,949, entitled "Devices and Systems for Setting Thresholds for Rotatable Storage Media," by Thorsten Schmidt, filed Feb. 18, 2003.

U.S. patent application Ser. No. 10/369,976 entitled "Methods for Setting End-Of-Seek Criteria for Rotatable Storage Media," by Thorsten Schmidt, filed Feb. 18, 2003.

FIELD OF THE INVENTION

The invention relates to the performance of rotatable storage media devices.

BACKGROUND

Rotatable storage media devices, such as magnetic disk drives and optical disk drives, are an integral part of computers and other devices with needs for large amounts of reliable memory. Rotatable storage medium devices are inexpensive, relatively easy to manufacture, forgiving where manufacturing flaws are present, and capable of storing large amounts of information in relatively small spaces.

A typical device having a rotatable storage medium includes a head disk assembly and electronics to control operation of the head disk assembly. The head disk assembly can include one or more disks. In a magnetic disk drive, a disk includes a recording surface to receive and store user information. The recording surface can be constructed of a substrate of metal, ceramic, glass or plastic with a very thin magnetizable layer on either side of the substrate. Data is transferred to and from the recording surface via a head mounted on an actuator assembly. Heads can include one or more read and/or write elements, or read/write elements, for reading and/or writing data. Drives can include one or more heads for reading and/or writing. In magnetic disk drives, heads can include a thin film inductive write element and a magneto-resistive read element.

Disk drives can operate in one or more modes or operations. In a first mode or operation, often referred to as seek or seeking a head moves from its current location, across a disk surface to a selected track. In a second mode, often referred to as track following, a head is positioned over a selected track for reading data from a track or writing data to a track.

In order to move a head to a selected track or to position a head over selected tracks for writing and reading, servo control electronics are used. In some disk drives, one disk can be dedicated to servo. The servo disk can have embedded servo patterns that are read by a head. Heads for data disks can be coupled to the servo disk head to be accurately positioned over selected tracks. In other disk drives, servo information can be embedded within tracks on the medium at regular intervals. Servo information is read as a head passes over a track to accurately position the head relative to a track.

While servo positioning circuitry is generally accurate, heads can drift from desired locations during track following operations. Reading or writing data during inaccurate head positioning can have adverse affects on drive performance.

In modern disk drives, tracks are placed increasingly closer together to increase data storage capacity. Narrower tracks are often used in order to increase the tracks per inch (TPI) on a disk. Measures should be used in drives to ensure that reliability and performance are maintained as data storage capacity increases.

BRIEF SUMMARY

Systems and devices in accordance with embodiments of the present invention take advantage of individual characteristics of devices including rotatable storage media. Characteristics such as off-track capability and track mis-registration can be determined in order to select end-of-seek criteria for individual heads or elements of devices.

Other features, aspects, and objects of the invention can be obtained from a review of the specification, the figures, and the claims.

DETAILED DESCRIPTION

Figure 1:
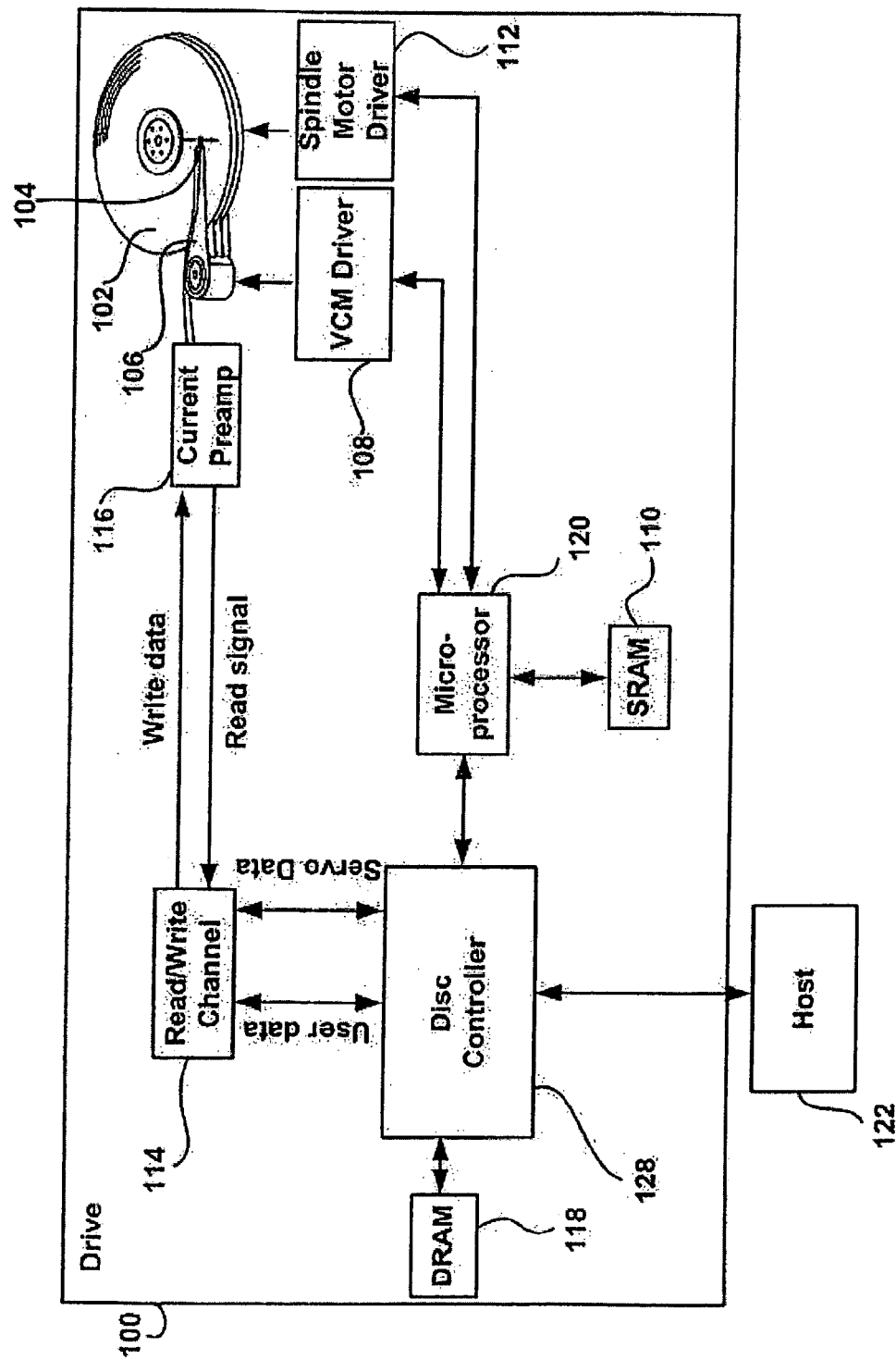
FIG. 1 is a diagram showing components of an exemplary disk drive that can be used in accordance with one embodiment of the present invention.

Systems and methods in accordance with embodiments of the present invention provide for reliability and performance in portable storage devices, such as magnetic disk drives and laser-recordable media. Referring to FIG. 1, for example, there is shown a typical disk drive 100 that can be used in accordance with one embodiment of the present invention. Disk drive 100 includes at least one rotatable storage medium 102 capable of storing information on at least one surface. Numbers of disks and surfaces may vary by disk drive. In a magnetic disk drive as described below, storage medium 102 is a magnetic disk. A closed loop servo system, including an actuator arm 106, can be used to position head 104 over selected tracks of disk 102 for reading or writing, or to move head 104 to a selected track during a seek operation. In one embodiment, head 104 is a magnetic transducer adapted to read data from and write data to the disk 102. In another embodiment, head 104 includes separate read elements and write elements. The separate read element can be a magneto resistive head, also known as an MR head. It will be understood that multiple head configurations may be used.

The servo system can include a voice coil motor driver 108 to drive a voice coil motor (VCM) (not shown) for rotation of the actuator arm 106, a spindle motor driver 112 to drive a spindle motor (not shown) for rotation of the disk 102, a microprocessor 120 to control the VCM driver 108 and spindle motor driver 112, and a disk controller 128 to accept information from a host 122 and to control many disk functions. A host can be any device, apparatus, or system capable of utilizing the data storage device, such as a personal computer or Web server. Disk controller 128 can include an interface controller in some embodiments for communicating with a host, and in other embodiments a separate interface controller can be used. The microprocessor can also include a servo controller, which can exist as circuitry within the drive or as an algorithm resident in the microprocessor 120, or as a combination thereof In other embodiments, an independent servo controller can be used. Additionally, microprocessor 120 may include some amount of memory such as SRAM or an external memory such as SRAM 110 can be coupled with the microprocessor. Disk controller 128 can also provide user data to a read/write channel 114, which can send signals to a current amplifier or preamp 116 to be written to the disk(s) 102, and can send servo signals to the microprocessor 120. Disk controller 128 can also include a memory controller to interface with memory 118. Memory 118 can be DRAM in some embodiments that can be used as a buffer memory.

Figure 2:
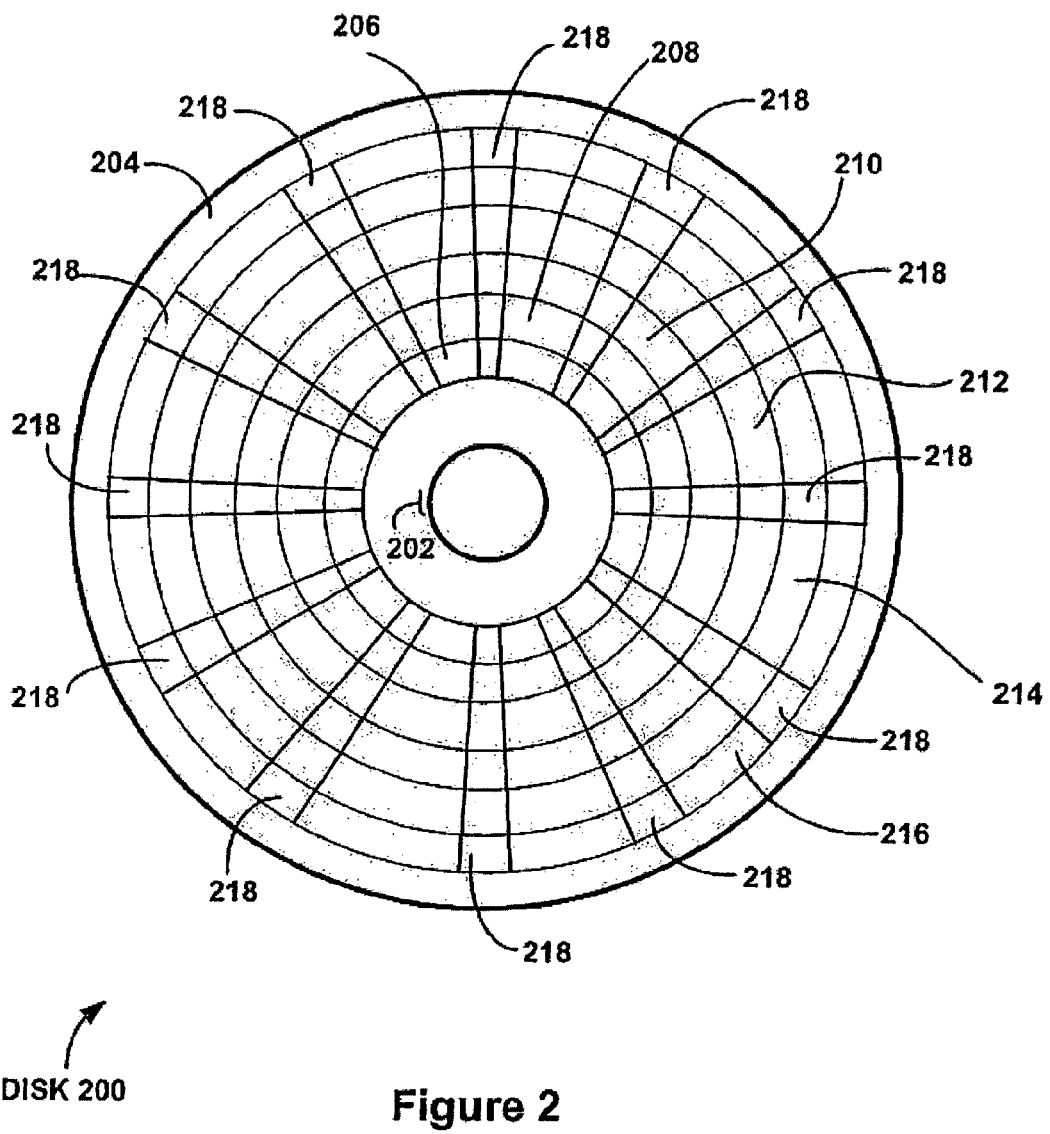
FIG. 2 is a top view of a rotatable storage medium that can be used in the drive of FIG. 1.

The information stored on a disk can be written in concentric tracks. FIG. 2 is a top view of an exemplary rotatable storage disk 200. A multiplicity of concentric tracks extend from near an inner diameter (ID) 202 of the disk 200 to near an outer diameter (OD) 204. These tracks may be arranged within multiple datazones 206–216, extending from the ID 202 to the OD 204. Data zones can be used to optimize storage within the data storage tracks because the length of a track in inner data zone 206 may be shorter than the length of a track at outer zone 216. While eight zones are shown in FIG. 2, any number of zones may be used. For example, sixteen zones are used in one embodiment. Disk 200 includes multiple servo sectors 218, also referred to as servo wedges. In this example, servo sectors 218 are equally spaced about the circumference of storage disk 200.

Figure 3:
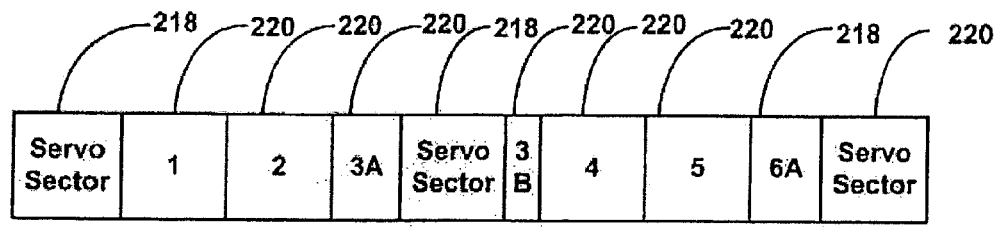
FIG. 3 is an illustration of a track of the medium of FIG. 2.

An exemplary track 222 of storage disk 200 is illustrated in FIG. 3. Servo sectors 218 split the track 222 into multiple data sectors 220. Each servo sector 218 is associated with the immediately following data sectors 220, as defined by a direction of rotation of disk 200. In the exemplary embodiment shown, identification fields for each data sector 220 are not used. As is illustrated, servo sectors can split data sectors resulting in a non-integer number of data sectors between servo wedges. The number of tracks may vary by embodiment. In one embodiment, for example, the number exceeds two thousand.

Figure 4:
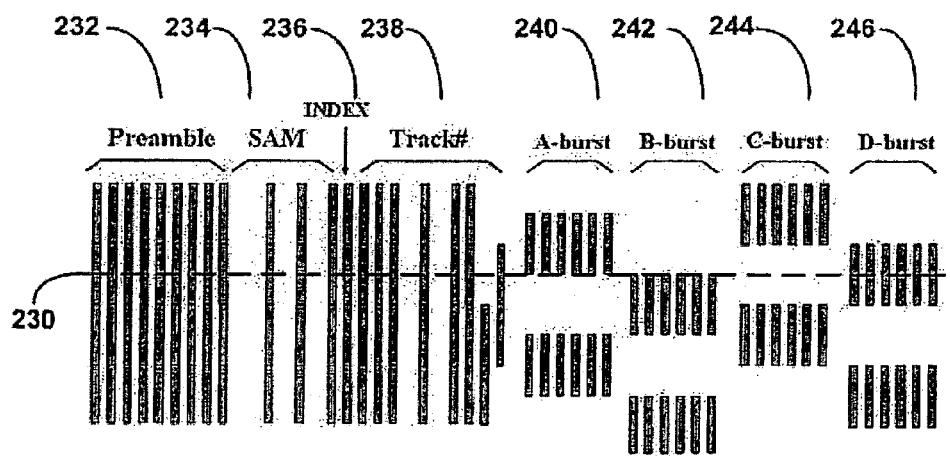
FIG. 4 is an illustration of a servo sector of the track of FIG. 3.

An exemplary servo sector 218 is illustrated in FIG. 4. The servo information shown includes a preamble 232, a servo address mark ("SAM") 234, an index 236, a track number 238, and servo bursts 240–246. These fields are exemplary, as other fields maybe used in addition to, or in place of, the exemplary fields, and the order in which the fields occur may vary. The preamble 232 can be a series of magnetic transitions which can represent the start of the servo sector 218. In the servo sector of FIG. 4, the SAM 234 specifies the beginning of available information from the servo sector 218. The track number 238, usually gray coded, is used for uniquely identifying each track. Servo bursts 240–246 are positioned regularly about each track, such that when a data head reads the servo information, a relative position of the head can be determined that can be used by a servo processor to adjust the position of the head relative to the track. This relative position can be determined by looking at the PES value of the appropriate bursts. The PES, or position error signal, is a signal representing the position of a head or element relative to a track centerline. The PES can also be used to predict a position of a head or element. Sampled PES values over time, for example, can be used to determine a predicted position of an element. Given a previously determined or known position, velocity of an element (the determination of which will be described herein) can be multiplied by time to determine a distance an element has traveled or will travel to predict an element position.

For example, a centerline 230 for a given data track can be "defined" by a series of bursts, burst edges, or burst boundaries, such as a burst boundary defined by the lower edge of A-burst 240 and the upper edge of B-burst 242. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 4, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk. It should be understood that the pattern of FIG. 4 is exemplary, and that many patterns can be used equally as well and can also take advantage of embodiments of the present invention.

The PES scheme described above is one of many possible schemes for combining the track number read from a servo wedge and the phases or amplitudes of the servo bursts. Many other schemes are possible that can benefit from embodiments in accordance with the present invention.

Figure 5:
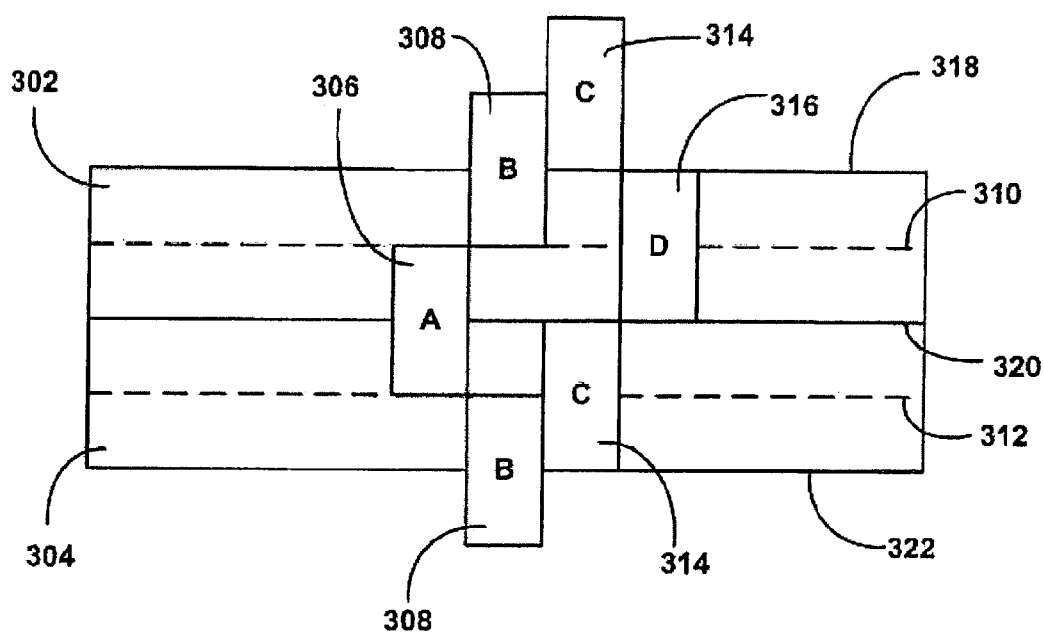
FIG. 5 is an illustration of a portion of two tracks of the medium of FIG. 2.

Despite the use of servo positioning information to control head position, heads of disk drives often move in relation to centerlines of selected tracks while reading data from a track or writing data to a track. Referring now to FIG. 5, there are shown two tracks 302 and 304 that can be used in accordance with one embodiment of the present invention. Other track formats and servo patterns can be used in accordance with other embodiments. A-bursts 306 and B-bursts 308 can define a centerline 310 of track 302 and a centerline 312 of track 304. Centerlines can be written or calculated. In an exemplary disk drive, a written centerline can be defined by a written burst pattern. In another exemplary disk drive, a calculated or averaged centerline can be determined from variations in written servo bursts. An averaged or calculated track centerline can be used to remove some effects of written and repeatable runout caused by misplaced heads during servo writing. C-bursts 314 and D-bursts 316 define boundaries 318–322 of tracks 302 and 304. In the example shown, the widths of tracks 302 and 304 are shown as equal to the widths of the servo bursts, 306,308,314, and 316 resulting in a data track width equal to a servo track width. In other embodiments, servo bursts can be narrower or larger than data tracks, resulting in data tracks widths not equal to servo track widths. The spacing of tracks on disk 202 can be defined by these burst patterns, and is generally referred to as track pitch. Track pitch may be defined in various ways. Track pitch can refer to a distance between theoretical track centers, e.g., the distance between 310 and 312. It may also refer to a distance between track boundaries, e.g., the distance between 318 and 320, or the distance between a top portion of an erase band on one side of a track and a top portion of an erase band on an opposite side of the track. In the example shown, the servo track TPI is equal to the data track TPI. In other embodiments, servo track TPI is not equal to data track TPI. Servo track TPI may be any fraction or multiple of a data track TPI, such as, for example, 3/2 times a data track TPI.

The path of a head following track 302 may vary radially from the written or calculated centerline 310 of track 302. This may cause reading of data in adjacent tracks, reading of erroneous data, writing unreadable data, or writing data into adjacent tracks. To prevent these negative effects on drive performance, thresholds can be used.

The location of heads or elements during seek operations and during the transition between seek operations and track-following operations is also important. During seek operations, heads are typically accelerated toward a target track and then decelerated in order to settle the head over the target track to enable track following for reading and/or writing data. Heads can overshoot target tracks and then oscillate about a target track centerline before settling to a track following operation. In order to ensure reliable reading and writing of data on selected tracks, criteria can be established to determine when a seek mode should end and a track following mode begin. The criteria used to determine when to shift from a seek mode to a track following mode is often referred to as end-of-seek criteria.

In one embodiment, thresholds and end-of-seek criteria can be stored on a selected portion of the disk or stored in some nonvolatile memory such as flash memory within the drive. Thresholds and end-of-seek criteria can be loaded into a faster memory such as SRAM or DRAM on start up of a drive to increase performance. Servo control circuitry, such as a controller, processor, or algorithm resident in a processor or controller can access the thresholds and end-of-seek criteria to use during drive operations.

Thresholds can be used to inhibit reading and writing during track following, as the results of such operations can be unreliable. Thresholds can be expressed in numerous ways, including defining a threshold as a distance or a combination of distance and head or element velocity. In one embodiment, a threshold can be a distance from a written or calculated track centerline. The distance can be defined in numerous ways, such as a percentage or fraction of track pitch. In another embodiment, a threshold can be a distance from a written or calculated track center combined with a velocity of a head or element. A read or write can be inhibited when a position of a head or element reaches or exceeds a threshold. Reading or writing can be inhibited when a head or element, a measured position of a head or element, or a predicted position of a head or element reaches or exceeds a threshold.

Figure 6:
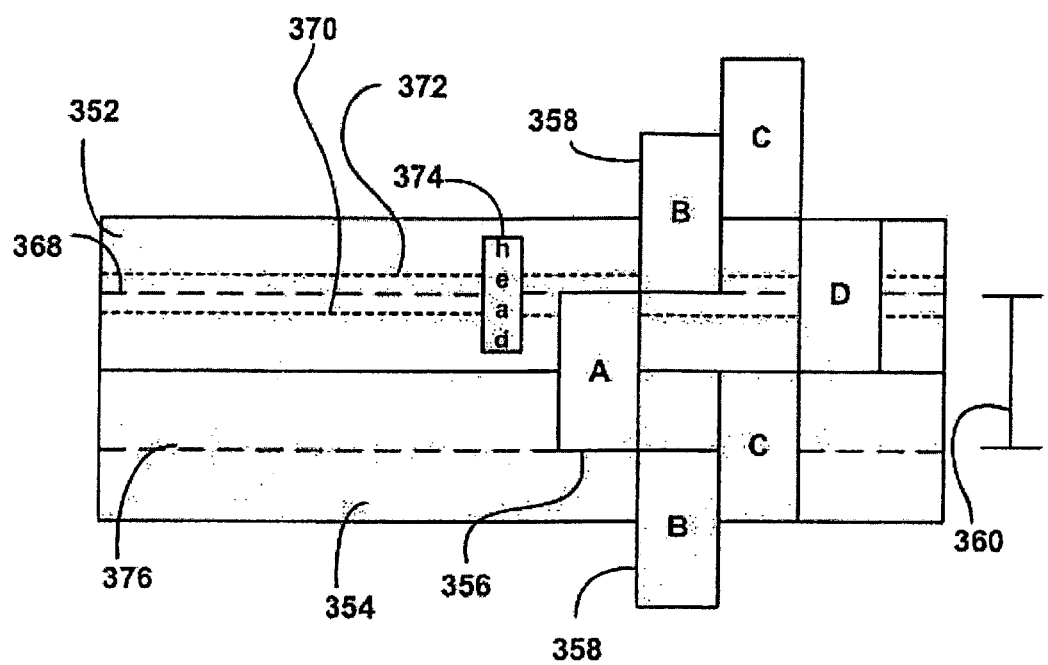
FIG. 6 is an illustration of a portion of two tracks of the medium of FIG. 2 showing exemplary thresholds.

Tracks 352 and 354 are illustrated in FIG. 6. Centerline 368 of track 352 and centerline 376 of track 354 are each defined by an edge of an A-burst 356 and a complimentary edge of B-burst 358. Using the term track pitch to refer to the distance between centerlines of tracks, the track pitch for this combination is shown as reference 360. A threshold can be chosen as a distance from the centerline 368 of track 352. This distance can be equal to a percentage of the track pitch from the centerline of the track. The threshold can equal about 10% of the track pitch from a written centerline of the track or a calculated centerline of the track. For example, in this case the thresholds are shown as 370 and 372. Thresholds 370 and 372 can be equal or different distances from the track centerline. Additionally, separate thresholds for reading and writing can be used. The track format of FIG. 6 is exemplary, as other track formats can be used in accordance with embodiments of the present invention.

While reading or writing, if a portion of head 374 is positioned at a point reaching or exceeding threshold 370 or 372 from the centerline 368 of track 352, a controller can inhibit reading or writing by the head. A threshold limit defined in this way may be referred to herein as a bump limit. It will be appreciated that reading and/or writing can be inhibited when a position of a region of the head, such as a central region, an outer region, or any other region reaches or exceeds a threshold. Additionally, reading and/or writing can be inhibited when a position of a read element or a write element reaches or exceeds the threshold.

A threshold can also be set as a combination of position and velocity of the head or actuator arm. A threshold defined in this way may also be referred to as a bump limit. A controller, in addition to monitoring the position of the head, can monitor a radial velocity of the head. This can be done in one embodiment by taking two servo position readings as the head moves along a track in order to obtain a radial distance. A head velocity can be determined by dividing by a time to move the radial distance. Filtering techniques can be used to achieve greater accuracy in velocity calculations. Many other methods for determining a velocity can be used in accordance with embodiments of the present invention, including, for example, observer systems. Using position in combination with velocity, a controller can inhibit reading or writing closer to a written or calculated center than threshold 370 and 372. A write or read can be inhibited when the head is traveling at or above a minimum radial velocity and reaches a second, shorter distance from the written or calculated centerline of the track. Using velocity in conjunction with a position can increase efficiency and reliability.

Setting thresholds for writing and reading can have several effects on drive performance. The use of thresholds or bump limits can help to ensure that data read by a head is reliable and is not data on an adjacent track. Bump limits can also ensure that data is not written to adjacent tracks.

Thresholds or bump limits can have adverse affects on drive performance. Setting stringent bump limits to ensure reliable data can slow down drives. As bump limits are set closer to a track centerline, the number of times a drive inhibits reading and/or writing can increase, leading to longer read and write times. The drive may have to advance the disk and attempt to read the data from the selected track again, or advance the disk and attempt to write data to the selected track again. As more reads and writes are inhibited, the drive spends an increased amount of time reading and writing data.

In addition to performance losses, strict bump limits can also cause drives to fail manufacturing criteria. Manufacturers typically set minimum performance constraints on drives, and test drives based on these constraints during self-test. For example, test data may be written and read to calculate average read and write times for drives. Strict bump limits can lead to slow read and write times that can cause a drive to fail manufacturing standards.

Individual drives can have individual performance characteristics. For example, the size of heads and elements can vary between drives. The spacing between a read element and a write element can also vary between heads. Disks can be shaped differently and have various imperfections on surfaces. Individual drive characteristics can lead to drives having different capabilities to keep heads positioned over selected tracks, different capabilities to read data when not centered over selected tracks, and different capabilities to be off track and not write data into adjacent tracks.

Despite these differences, threshold criteria for inhibiting reads and writes by drives have typically been set to nominal values, statistical predictions, averaged values, or other predicted values. Drive performance can be optimized by using measured characteristics of individual drives to set individualized thresholds.

Many factors can influence the ability of drives to accurately read and write data within selected tracks, including off-track capability and track mis-registration. In one embodiment of the present invention, the off-track capability and track mis-registration of a head or element are measured in order to set individualized thresholds for each head or element of a disk drive.

Off-track capability generally refers to the ability of a head of a disk drive to accurately read data from a selected track or write data to a selected track. It is also used more specifically to refer to the ability of a head to read data from a selected track when the head is positioned away from a written or calculated centerline of a selected track, and the ability of a head to write data to a selected track without impinging on an adjacent track.

As a read element moves along a selected track, the element will often move in a radial direction with respect to the disk surface. Therefore, the element is often not centered directly over a centerline of the selected track. Elements can have different abilities to read data when not centered on track which can be due to many factors such as head or element width. For example, narrow read elements can travel greater radial distances before crossing into adjacent tracks and reading erroneous data.

The ability to read data and write data when not centered over a track can also depend upon a width of a write head or element. Wider write elements can write wider data tracks. A wider written track can mean that a read element has a greater likelihood of reading reliable data. More narrow write elements can write narrower data tracks. A read element is less likely to read reliable data from a narrow data track. A read element can move a short distance from a track centerline and not read any data or read old data written to the track. A wider write element can also write data into adjacent tracks when positioned a shorter radial distance relative to a track centerline than a narrower write element.

Figure 7:
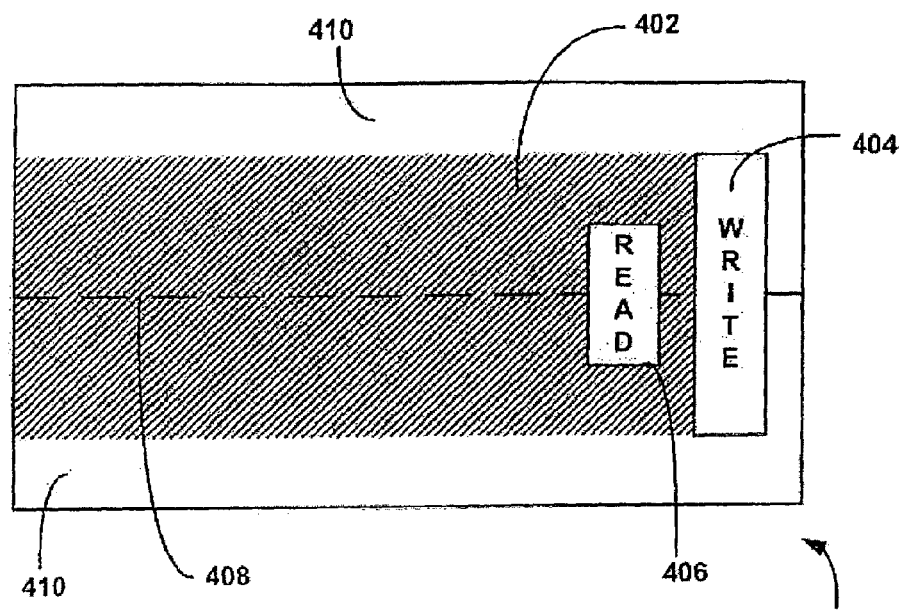
FIG. 7 is an illustration of an exemplary read element/write element having favorable off-track capability.

Referring to FIG. 7, there is shown a track 400. The read element/write element combination shown in FIG. 7 illustrates a drive having a favorable off-track capability. Write element 404 has written data 402 within track 400. As shown, write element 404 is wider than read element 406, and has written a wide track of data 402. Read element 406 can move a greater distance from the written or calculated centerline 408 of track 400 and still read data 402. The area 410 between the written data 402 and the track boundaries of track 400 represents either old data or no data at all. If the read head moves beyond written data 402, the head may begin to read old data or read no data at all.

Figure 8:
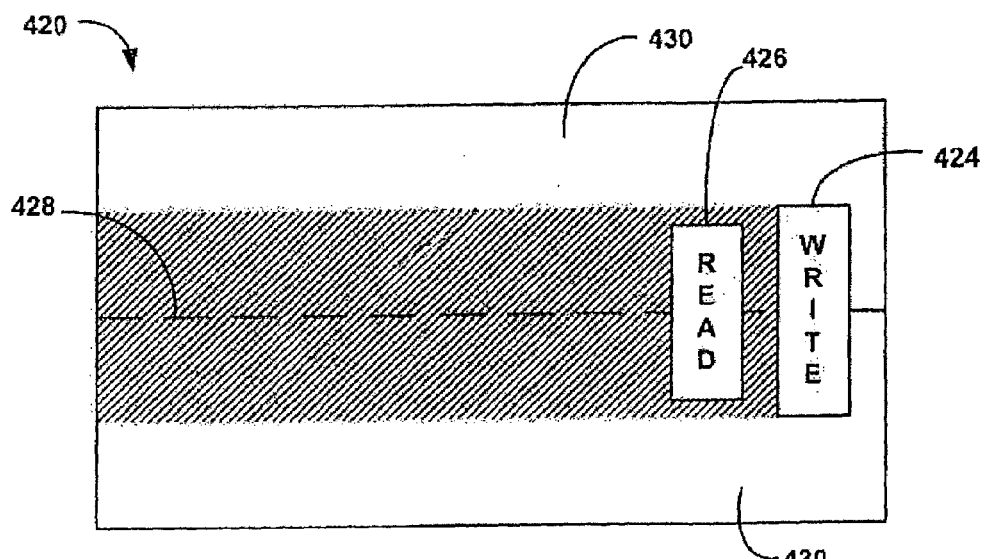
FIG. 8 is an illustration of an exemplary read element/write element having less favorable off-track capability.

Referring to FIG. 8, there is shown another track 420. The read element/write element combination in FIG. 8 illustrates a drive having less favorable off-track capability. While read element 426 is narrower than write element 424, the difference in size is not as considerable as the difference in read element 406 and write element 404 shown in FIG. 7. Read element 426 may only move a short distance from the written or calculated centerline 428 of track 420 before being over old data or no data 430.

Figure 9A:
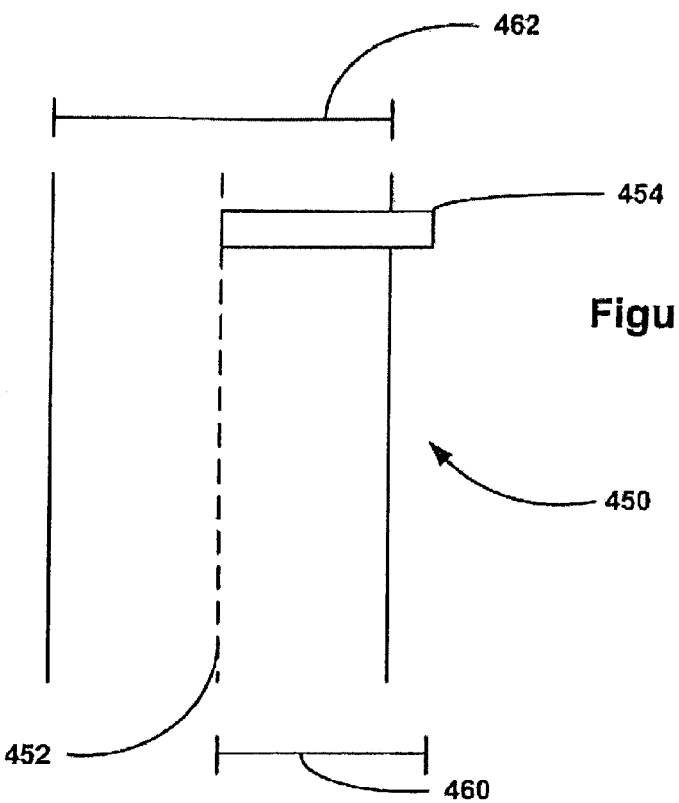
FIGS. 9a and 9b are illustrations of a method for determining the widths of read and write elements that can be used in accordance with one embodiment of the present invention.
Figure 9B:
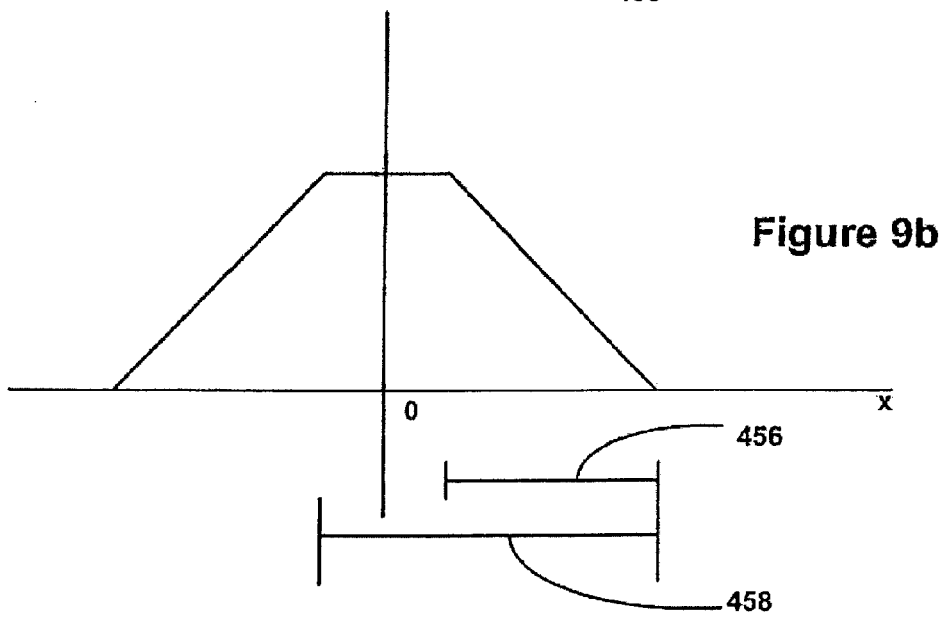

During self-test, for example, off-track capability can be determined in a number of ways. FIGS. 9*a* and 9*b* illustrate a first exemplary method for determining an off-track capability of a head or element of a head. In this embodiment, a track profile is created by plotting a read element voltage as a function of the position of the read element on a written track, as shown in FIG. 9*b*. FIGS. 9*a* and 9*b* show the read element voltage as the read element is moved across a written track. A similar test can be performed by plotting the voltage as a function of any point on the read element.

The selected track, as well as the vicinity of the selected track, can be DC-erased so that a noise-free background is provided. After erasing the track and its vicinity, a selected track can be written. FIG. 9 shows a written track 450 with a written or calculated centerline 452. Read element 454 can be progressively stepped from a sufficiently long distance from the written track on the right to a sufficiently long distance from the written track on the left. The sufficiently long distance in this embodiment should be at least equal to $\frac{1}{2}(T_W+T_R)$, where $T_W$ is the written track width 462 and $T_R$ is the read head width 460. This can ensure that no portion of read element 454 is over written track 450 when the process begins.

As read element 454 crosses the written data track 450, the amplitude of the read element signal increases until the read element is positioned fully over written data track 450. Once all portions of read element 454 are over written data track 450, the amplitude will plateau until the read element begins to leave written data track 450. The distance shown as 456 in FIG. 9b corresponds to the width of the read element 454. Since the voltage signal increases from a first portion of the read element crossing the written data track until the read element is fully positioned over the written data track, the distance traveled while the voltage increases is approximately equal to the width of the read element.

The distance 458 is approximately equal to the write element width. While the voltage signal is constant, the entire portion of read element 454 is positioned over written data track 450. The voltage signal begins to decrease when a portion of read element 454 is no longer positioned over the written track 450. Therefore, the distance the center portion of read element 454 travels from first detection of a signal until a signal decrease is approximately equal to the width of written data or the width of the write element. By varying the current supplied to the write element, the write element may write a data track wider or narrower than the width of the write element. Thus, these measurements are only approximations of the width of the write element. However, a controlled current can be used when writing to make the written data correspond as closely as possible to the width of the write element.

The relative and individual widths of the read element and write element can be used to calculate or estimate an off-track capability of a head or element. The off-track capability or the widths of the elements can be used to set individual thresholds for drives or elements. If a read element is narrow in comparison to a write element, a threshold limit can be extended from a centerline or a larger radial velocity of an element can be used as a threshold because of favorable off-track capability. Likewise, if a read element is not narrow in comparison to a write element, a threshold limit can be set closer to a centerline or a smaller radial velocity of an element can be used as a threshold because of less favorable off-track capability. The individual widths of the elements can also be used to set thresholds. For example, tighter thresholds can be used to inhibit writing into adjacent tracks by wide write elements and to inhibit wide read elements from reading old data or data in adjacent tracks. Looser thresholds can be used with narrow elements that may travel greater distances before reading old data or writing data into adjacent tracks. Different thresholds or the same thresholds can be used for reading, writing, read elements, and write elements.

Favorable off-track capability and track mis-registration, as used herein, refer to a head or element having acceptable performance with respect to either factor. For example, a head or element may have favorable off-track capability because the off-track capability reaches or exceeds that of similar heads or elements or predicted values. Likewise, a head or element may have a favorable track mis-registration because the track mis-registration is less than or equal to that of similar heads or elements or predicted values. Predicted values, as used herein can refer to predetermined, averaged, statistical, nominal, desired, or other values.

Loosened, as used herein, refers to requiring less stringent criteria for thresholds or ends-of-seek. For example, a threshold maybe loosened by extending the distance used farther from a track centerline or using a higher velocity than a nominal, averaged, predicted, or predetermined value. Likewise, end-of-seek criteria maybe loosened by using higher PES threshold values or requiring fewer samples to be within the PES values than nominal, averaged, statistical, predicted, or predetermined values.

Tightened, as used herein, can refer to requiring more stringent criteria for thresholds or ends-of-seek. For example, a threshold may be tightened by using a distance closer to a track centerline or using a lower velocity than a nominal, averaged, statistical, predicted, or predetermined value. Likewise, end-of-seek criteria may be tightened by using lower PES threshold values or requiring more samples to be within the PES values than nominal, averaged, statistical, predicted, or predetermined values. Numerous methods described and not described can be used in accordance with the present invention to loosen or tighten thresholds or end-of-seek criteria.

Figure 10:
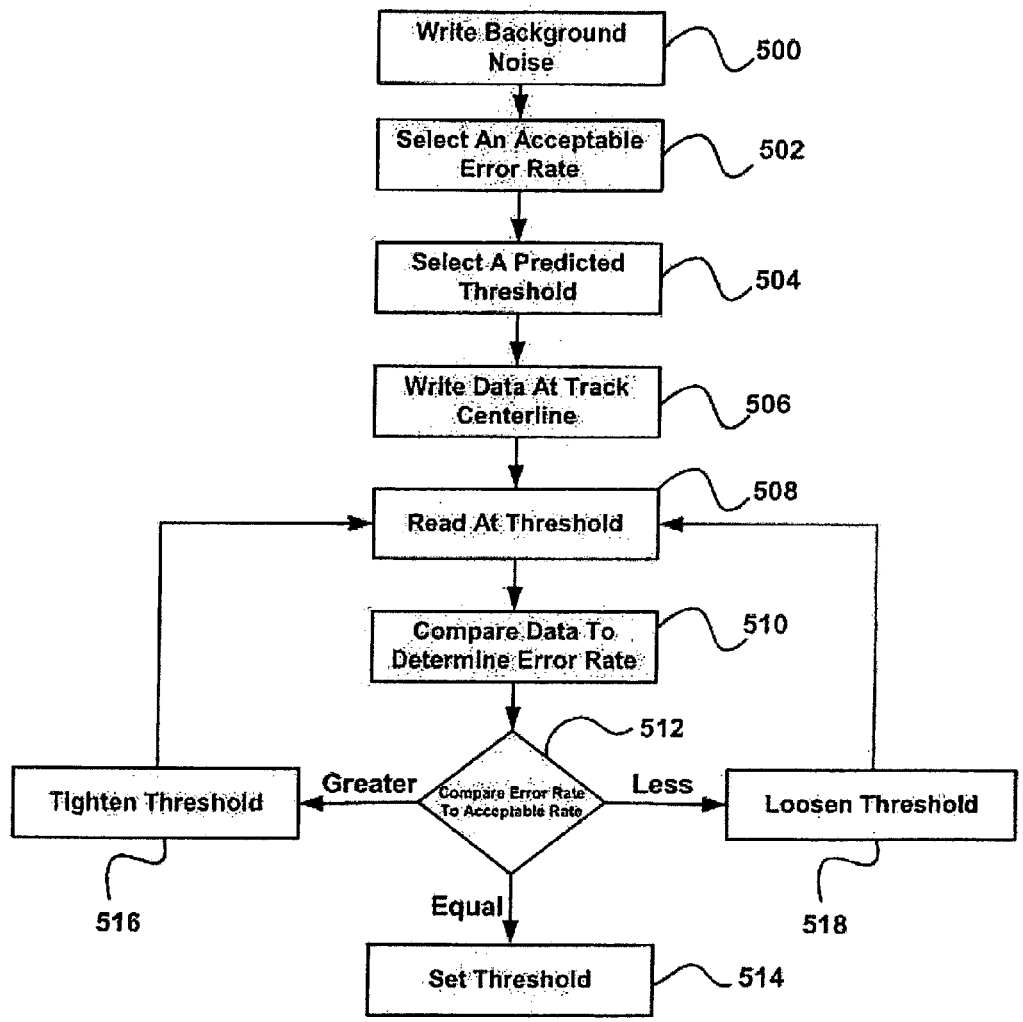
FIG. 10 is an illustration of a method for determining an off-track capability of a head or element that can be used in accordance with one embodiment of the present invention.

FIG. 10 illustrates a flowchart of an exemplary method for determining an off-track capability that can be used in accordance with one embodiment of the present invention. Background noise is written to an area wider than a selected track in a step 500. An acceptable error rate is selected in step 502. Any error rate may be chosen in accordance with particular design goals. For example, an error rate of $10^{-4}$ to $10^{-6}$ errors per bit can be chosen. In step 504, a threshold is selected. This threshold can be a predicted threshold as defined above, or any other chosen threshold value, including a track centerline. In step 506, a known data pattern is written along a track centerline. The data is then read in step 508 at the selected threshold. In step 510, the data read is compared to the known data pattern to determine an error rate. This error rate is compared in step 512 with the acceptable error rate selected in step 502. If the error rate is equal to the selected error rate, the threshold selected in step 504 is set in step 514. If the error rate is greater than the acceptable error rate, the threshold is tightened in step 516 and the process beginning at step 508 is repeated. If the error rate is less than the acceptable error rate, the threshold is loosened or extended in step 518 and the process beginning at step 508 is repeated. The method continues until the determined error rate equals the acceptable error rate. This method can optimize threshold values to achieve acceptable error rates in read data. It will be understood that a range of acceptable error rates can be chosen rather than a single value.

Figure 11:
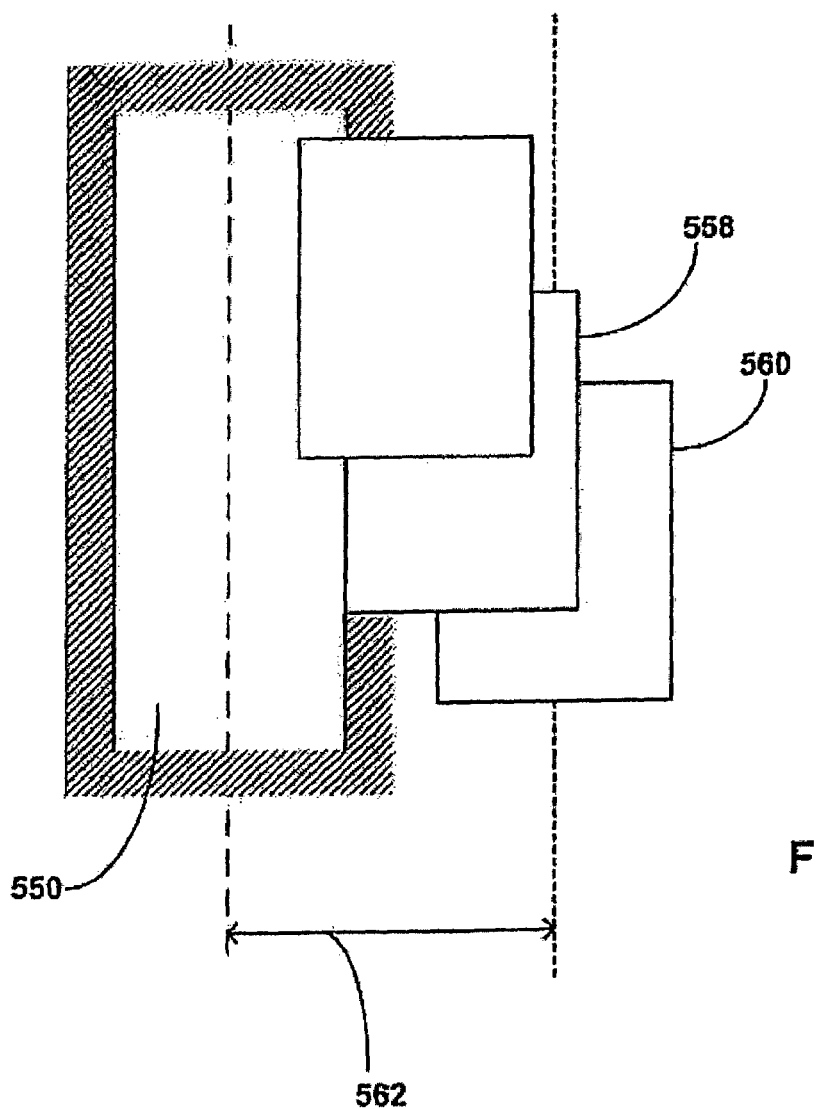
FIG. 11 is an illustration of a method for determining an off-track capability of a head or element that can be used in accordance with one embodiment of the present invention.

The off-track measurement for one track as discussed above can also be repeated to determine the effects of data written in adjacent tracks, as illustrated in FIG. 11. An adjacent track 560 is written some distance away from the test track 550. The distance between the two tracks can be measured as a distance between their respective centerlines 562. The off-track capability is again measured for the test track. If the adjacent track is written a sufficient distance from the test track, the off-track capability should be about the same as that calculated without the adjacent track's effect. Another track 558 is then written closer to the test track and the off-track capability measurement repeated. As the adjacent track comes closer and closer to the test track, the off-track capability value will generally decrease (an increase in off-track capability may be seen when erase bands from the two tracks meet and cover over the background noise). At some track pitch, the error rate measured by comparing the read data to the known data will reach a predetermined unacceptable level, for example $10^{-6}$ errors per bit. The results of this test can be used to determine how close together data tracks may be written and still reliably read data from selected tracks. Write thresholds can be set at a position where an unacceptable error rate is reached. Furthermore, this information can be used to set a read threshold at a point where it may be detecting information written in an adjacent track.

Track mis-registration can also be used to determine thresholds for individual heads or elements. Track mis-registration (TMR) will be used herein as a general term to describe the position of a head or element in relation to a desired location of the head or element. TMR can include both repeatable or synchronous runout (RRO) and non-repeatable or nonsynchronous runout (NRRO). RRO refers to inaccuracies in head position caused by consistently repeatable manifested factors. These inaccuracies are repeated under most drive conditions. Non-repeatable runout refers to inaccuracies in head position caused by various conditions such as temperature or shocks. The term TMR can be used more specifically to refer to particular distance relationships within a drive. For example, read TMR may refer to a distance of the read element from a written or calculated centerline of a track when reading data along a selected track. Write TMR may be used to refer to a distance of the write element from a written or calculated centerline of a track when writing data to a selected track. Write-to-read TMR may be used to refer to a distance of a read element from a centerline of written data when reading data from a selected track. Write-to-write TMR may be used to refer to a difference between a desired track pitch and an actual track pitch, often caused by adjacent track "squeeze." On-track track mis-registration can refer to a track mis-registration while a head or element is in a track following mode. On-track TMR generally refers to TMR during read or write operations after seek vibrations have settled out. Seek track mis-registration can refer to a TMR during a limited period after a transition from a seek mode to a track following mode. For example, seek TMR can refer to the TMR during one or two revolutions of the disk after ending a seek.

TMR for a drive can be measured using any of several methods. In one embodiment, overall TMR including both NRRO and RRO is calculated from the root mean-square of the position error signal (PES). That is, overall TMR is equal to $$\sqrt{\frac{1}{N}\sum_{j=0}^{N-1}(PES_j)^2}.$$

In another embodiment, the overall TMR is calculated using the standard deviation of the distribution of the head position. In this embodiment, overall TMR is defined as three times the standard deviation, where the standard deviation, $\sigma_x$, of the distribution of the head position x is equal to $$\sqrt{\frac{\sum_{j=0}^{N-1}(x_j-\bar{x})^2}{N-1}}.$$

The variable $\bar{x}$ is the mean of the head position and can be approximated or assumed to be 0 where the mean position of the head is at a track centerline. Other methods for calculating TMR known in the art may also be used.

Measured values of TMR can be used to determine optimal thresholds for a drive. Large measured TMR indicates that a head may vary from the centerline of a track by a large margin or that a head may frequently move from the centerline of a track. A drive with a large TMR can reach thresholds more frequently and slow down a drive's read and write time. In order to compensate for unfavorable TMR in a drive, thresholds can be extended or loosened. This can reduce the occurrence of write and read inhibits.

Using measured TMR and off-track capability to set individualized thresholds for drives can improve both the performance of drives and the number of drives meeting manufacturing standards. In accordance with an exemplary embodiment of the present invention, thresholds can be determined during the manufacture of a drive using measured values of both off-track capability and TMR. These steps can be performed during self-test of the drive, for example. In one embodiment, off-track capability and TMR are calculated for each track on a disk and used to establish individual thresholds for every track. In another embodiment, off-track capability and TMR are averaged across data zones so that individual thresholds can be established for each data zone on a disk. In some embodiments, different thresholds for writing and reading are established. And in another exemplary embodiment, a microprocessor for a disk drive is programmed to calculate off-track capability and TMR and set thresholds after the drive is in use by a consumer.

Figure 12:
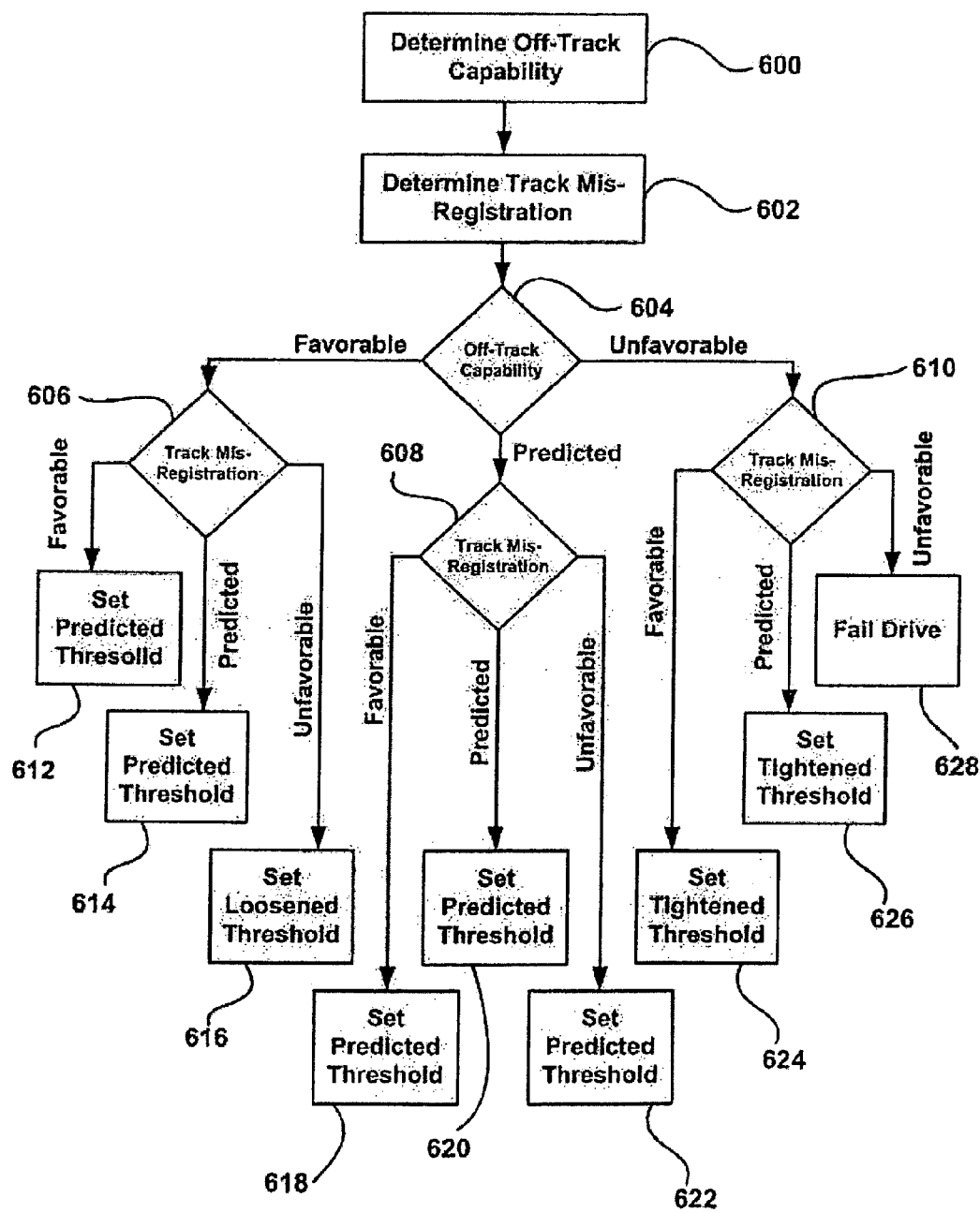
FIG. 12 shows a flowchart illustrating an exemplary method for determining thresholds in accordance with one embodiment of the present invention.

FIG. 12 shows a flowchart of a method for setting thresholds in accordance with an embodiment of the present invention. In a step 600, an off-track capability of a head or element is determined. Any method for determining an off-track capability can be used, including those described herein or others not described but known in the art. In a step 602, a track mis-registration is determined. This may also be done by any of the methods described herein or others not described but to known in the art.

In a step 604, it is determined whether the off-track capability is favorable. This can be determined by numerous methods including, for example, a comparison of the off-track capability or read/write element width with a predicted ability or width, or by comparison with values for similar heads or elements. Comparisons can also be made between a threshold where an unacceptable error rate is reached and a predicted threshold. Other methods or criteria can also be used to determine if an off-track capability is favorable. Depending on the result of step 604, it is determined in steps 606, 608, or 610, whether a track mis-registration is favorable. This may also be determined by numerous methods including, for example, a comparison of the track mis-registration with the track mis-registration of similar heads of elements, or by a comparison of the track mis-registration with a predicted value.

In steps 612–628, the threshold is set depending on the results of steps 604 and 606–610. If the track mis-registration and off-track capability are both favorable, if the off-track capability is favorable and the track mis-registration predicted, if the off-track capability is predicted and the track mis-registration favorable, or if both are predicted, a predicted threshold can beset in steps 612, 614, 618, or 620. While a favorable track mis-registration and off-track capability indicate that threshold values could be loosened, reliability can be improved by using a predicted value. If the off-track capability is favorable and the track mis-registration unfavorable, a loosened threshold can be set in step 616. The unfavorable track mis-registration indicates that the head or element may move from a track centerline, but the favorable off-track capability indicates that reading and writing can remain reliable at the off-track position.

If the off-track capability is unfavorable and the track mis-registration favorable, a tightened threshold can be set in step 624. The unfavorable off-track capability indicates that the head or element may not read or write reliable data when off a centerline, but the favorable track mis-registration indicates that the head or element will more likely remain positioned in desired locations. If both values are unfavorable, a head, element, or drive may be failed in step 628. If off-track capability is predicted and track mis-registration unfavorable, a predicted threshold can be set in step 622. Decreases in performance may be seen by the use of a predicted threshold in this case, but reliability of data can be maintained. If off-track capability is unfavorable and track mis-registration predicted, a tightened threshold can be set in step 626 to minimize the effects of the unfavorable off-track capability.

Figure 13:
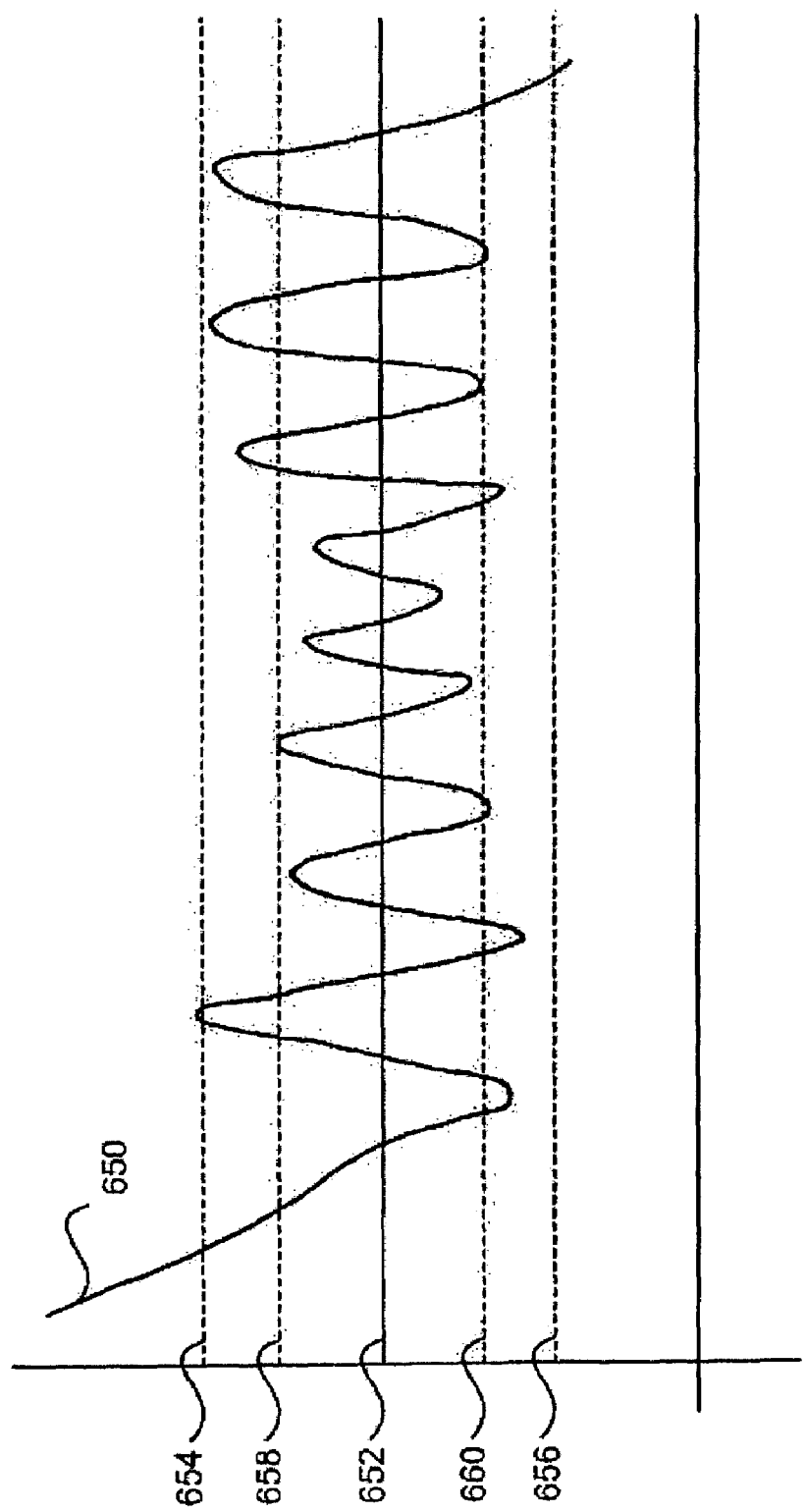
FIG. 13 is a graph illustrating an exemplary PES signal plotted against time as ahead of a disk drive ends a seek operation and settles on a selected track in order to enter a track following mode.

Off-track capability and track mis-registration can also be used to set individual end of-seek criteria for drives. When end-of-seek criteria is met, a seek operation can end and/or a track following operation begin. FIG. 13 shows a graph illustrating an exemplary PES 650 plotted against time as ahead of a disk drive ends a seek operation and settles on a selected track in order to enter a track following mode for reading or writing data on the selected track. The PES 650 is large at the beginning of the time period shown, decreases, and then oscillates about the selected track center as the head settles onto the selected track. PES value 652 can be representative of a centerline of the selected track. PES values 654 and 656 can be threshold values of the PES 650 used in determining when a seek operation should end. For example, the PES can be sampled at intervals of time during a seek operation. The seek operation can end when some specified number of samples, e.g. four to six, of the PES are between the threshold values of the PES. By waiting until some number of samples of the PES are within threshold values to end seek operations and/or begin track following operations, reliability of data written and read can be maintained. The end-of-seek criteria can be met by a number of samples of the PES reaching or exceeding the specified number of samples and by the samples of the PES being equal to or less than the threshold values.

Other methods for ending seek operations can also be used. Tighter threshold values can be used to more quickly end seek operations when the head has settled to an acceptable position. For example, threshold values 658 and 660 which are closer to the PES value 652 representative of the centerline of the selected track can be used. In this example, the number of samples required within these values before ending a seek operation can be less than the number of samples used in the previous example. Two or three samples within these values can be sufficiently indicative of a stable head position to end a seek operation and begin a track following operation. Combining the two methods described can be used to provide quick and reliable ends to seek operations.

The foregoing descriptions of end-of-seek criteria are merely exemplary and numerous other examples known to those skilled in the art can be used in accordance with the present invention. For example, in some methods a combination of a velocity of a head can be used with the PES signal value to indicate end-of-seek operations. The end-of-seek criteria can be met when a velocity of a head is equal to or less than a specified velocity. In other examples, sampled values over time can be used to predict a position of the head at a subsequent interval. The predicted value can be used to more quickly end a seek operation when it is predicted that the head will be sufficiently stable to begin reading or writing.

Figure 14:
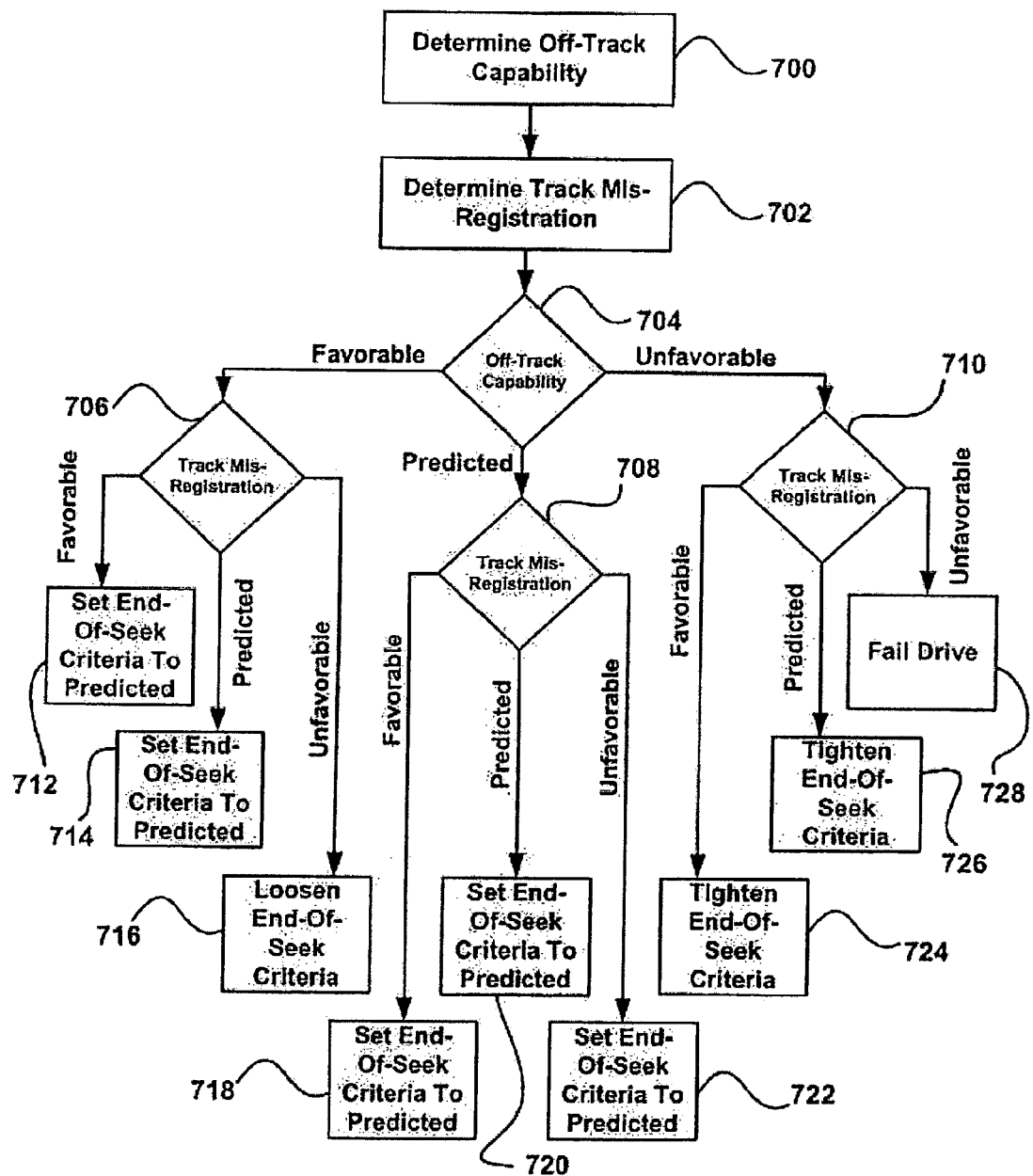
FIG. 14 shows a flowchart illustrating an exemplary method for determining end-of-seek criteria in accordance with one embodiment of the present invention.

In one embodiment of the present invention, measured values of off-track capability and track mis-registration are used to modify end-of-seek criteria in order to optimize drive performance, reliability, and manufacturing output. FIG. 14 shows a flowchart for setting end-of-seek criteria in accordance with one embodiment of the present invention. An off-track capability of the drive is determined in step 700. This may be done using any of the methods described herein or others known but not described. A track mis-registration is determined in step 702. Any of the methods for determining track mis-registration described herein maybe used, as well as others known but not described. In step 704, it is determined whether the off-track capability is favorable, unfavorable, or predicted. This can be determined by numerous methods including, for example, those discussed with respect to setting thresholds for track-following operations. In steps 706–710, it is determined whether the track mis-registration is favorable. This can be determined by numerous methods including, for example, those discussed with respect to setting thresholds for track-following operations. If both track mis-registration and off-track capability are favorable or predicted, if off-track capability is favorable and track mis-registration predicted, or if off-track capability is predicted and track mis-registration favorable, predicted or nominal end-of-seek criteria can be set in step 712, 714, 718, and 720. If both are unfavorable, the drive may be failed in step 728. If track mis-registration is favorable and off-track capability unfavorable, tightened end-of-seek criteria can be set in step 724. If off-track capability is favorable and track mis-registration unfavorable, loosened end-of-seek criteria can be set in step 716. If off-track capability is predicted and track mis-registration unfavorable, predicted end-of-seek criteria can be set in step 722. If off-track capability is unfavorable and track mis-registration predicted, tightened end-of-seek criteria can be set in step 726.

Figure 15:
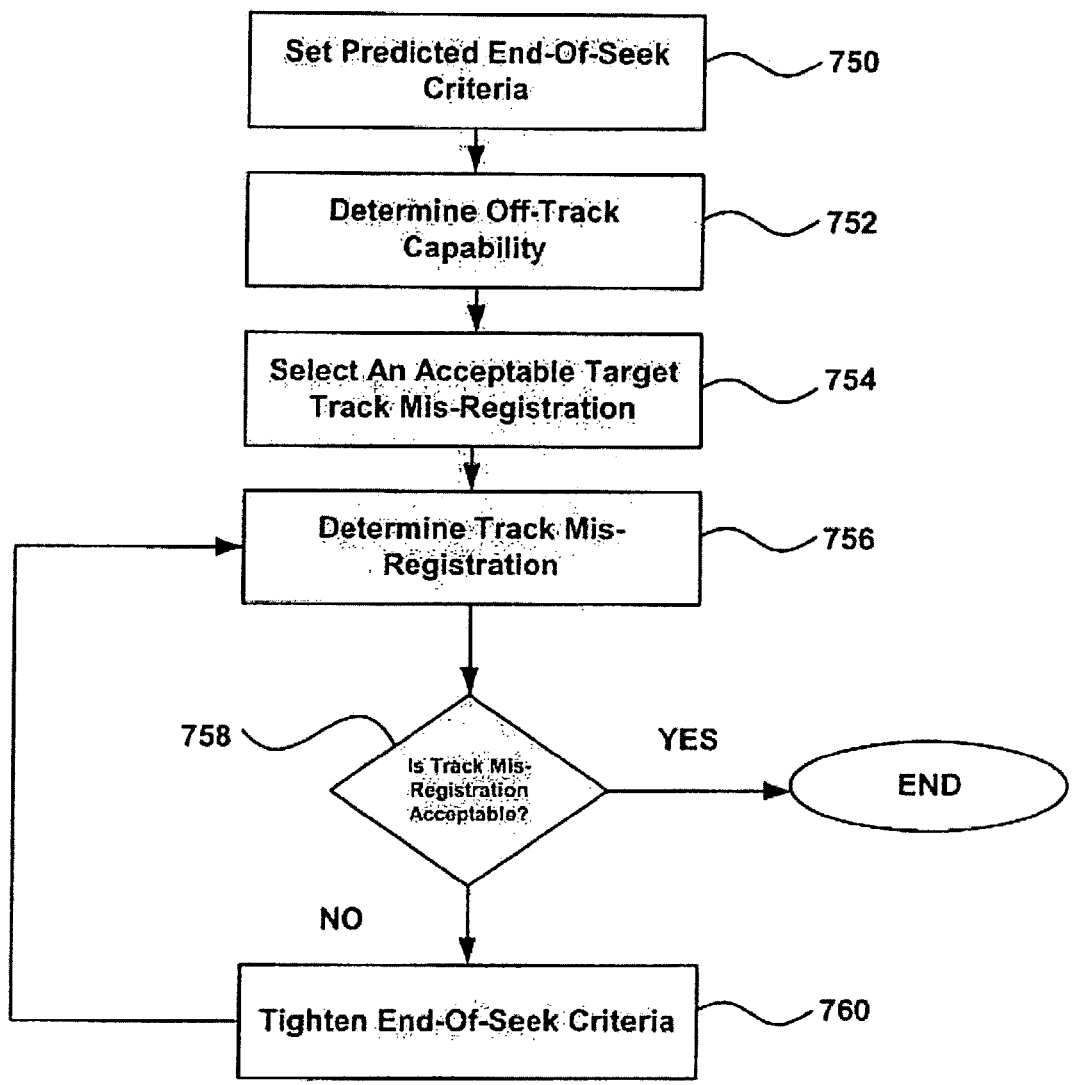
FIG. 15 shows a flowchart for determining end-of-seek criteria in accordance with one embodiment of the present invention.

FIG. 15 shows a flowchart for setting end-of-seek criteria in accordance with one embodiment of the present invention. In a step 750, a predicted end-of-seek criteria is set. An off-track capability is determined in step 752. In step 754, an acceptable track mis-registration is determined from the off-track capability. If the off-track capability is favorable, a larger track mis-registration can be acceptable. If the off-track capability is unfavorable, a track mis-registration that is smaller may be preferred. In a step 756, a track mis-registration is determined. Any of the methods for determining track mis-registration described herein can be used, as well as others known but not described. In one embodiment, the track mis-registration is determined for a number of wedges encountered by a head after beginning a track following operation and/or ending a seek operation. The track mis-registration can be determined immediately after ending a seek operation, or can be determined after a head or element has encountered a number of wedges while in a track following operation. For example, a determination of a track mis-registration can begin after one revolution of a disk while in a track following operation. The track mis-registration can be determined for any number (N) of wedges after beginning the determination. N can be selected to include, for example, a single wedge after ending a seek operation or a number of wedges over one or two complete revolutions of the disk after ending a seek operation. In step 758, it is determined whether the track mis-registration is within the acceptable track mis-registration determined in step 754. If it is determined that the track mis-registration is acceptable, the end-of-seek criteria can be left at the criteria set in step 750. If the track mis-registration is determined to be unfavorable in step 708, the end-of-seek criteria can be tightened in a step 760. The track mis-registration is then determined again with the tightened end-of-seek criteria. If the track mis-registration is now within the acceptable track mis-registration, the method ends and the tightened criteria are used. If the track mis-registration is still unfavorable, the end-of-seek criteria are again tightened and the method repeated until an acceptable track mis-registration is determined.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A device including a rotatable storage medium, comprising:
   an element capable of reading data from the rotatable storage medium, the element having an off-track capability and a track mis-registration;
   a controller adapted to enable a track-following operation when an end-of-seek criteria is met; and
   wherein the end-of-seek criteria is determined using the off-track capability and/or the track mis-registration of the element.

2. The device of claim 1, further comprising a head to which the element is coupled.

3. The device of claim 1, wherein the off-track capability is determined using a width of the element.

4. The device of claim 1, wherein the element includes at least one of a read element and a write element.

5. The device of claim 2, wherein the head is further coupled to a write element; and
   wherein the off-track capability is determined using a difference in a width of the element, which is a read element, and a width of the write element.

6. The device of claim 1, wherein the track mis-registration is a distance between a central region of the element when reading data along a selected track of the rotatable storage medium and a centerline of the selected track.

7. The device of claim 1, wherein the track mis-registration is a distance between a centerline of a written track and a centerline of the selected track.

8. The device of claim 1, wherein the track mis-registration is a distance between a central region of the element when reading data along a selected track of the rotatable storage medium and a centerline of a written track.

9. The device of claim 1, wherein the track mis-registration is three times a calculated standard deviation of a position distribution of the element.

10. The device of claim 1, wherein the off-track capability is an ability of the element of the device to read data relative to a calculated centerline of a selected track.

11. The device of claim 1, wherein the off-track capability is an ability of the element of the device to read data relative to a written centerline of a selected track.

12. The device of claim 1, wherein the end-of-seek criteria is a number of samples of a position error signal within a threshold.

13. The device of claim 12, wherein the threshold is a selected value of the position error signal.

14. The device of claim 1, wherein the rotatable storage medium includes multiple data zones, and an end-of-seek criteria is determined for at least two data zones.

15. The device of claim 14, wherein the end-of-seek criteria for the at least two data zones are different.

16. The device of claim 1, wherein the rotatable storage medium includes multiple tracks, and an end-of-seek criteria is determined for at least two tracks.

17. The device of claim 16, wherein the end-of-seek criteria for the at least two tracks are different.

18. The device of claim 1, wherein the track following operation includes at least one of reading and writing data.

19. The device of claim 1, wherein a loosened end-of-seek criteria is selected when the element has a favorable off-track capability and an unfavorable track mis-registration.

20. The device of claim 1, wherein a tightened end-of-seek criteria is selected when the element has an unfavorable off-track capability and a favorable track mis-registration.

21. The device of claim 1, wherein the off-track capability and the track mis-registration are determined during a self-test of the device.

22. The device of claim 1, wherein the off-track capability and the track mis-registration are measured.

23. The device of claim 1, wherein the off-track capability and the track mis-registration are calculated.

24. The device of claim 1, wherein the end-of-seek criteria is determined during a self-test of the device.

25. The device of claim 1, wherein the end-of-seek criteria is selected using the off-track capability and the track mis-registration.

26. The device of claim 1, wherein the end-of-seek criteria is calculated using the off-track capability and the track mis-registration.

27. The device of claim 1, wherein the end-of-seek criteria is determined after the device has been manufactured.

28. A device including a rotatable storage medium, comprising:
   means for determining an off-track capability and a track mis-registration of an element;
   means for determining an end-of-seek criteria using the off-track capability and/or the track mis-registration of the element; and
   means for enabling a track-following operation when the end-of-seek criteria is met.

29. A device including a rotatable storage medium, comprising:

an element having an off-track capability and a track mis-registration;

a controller adapted to enable a track-following operation when an end-of-seek criteria is met; and wherein the end-of-seek criteria is selected during a self-test of the device using the off-track capability and/or the track mis-registration.

30. A device including a rotatable storage medium, comprising:

an element capable of at least one of reading data from and writing data to the rotatable storage medium, the element having an off-track capability and a track mis-registration;

a controller adapted to enable at least one of a read operation and a write operation when an end-of-seek criteria is met; and wherein the end-of-seek criteria is determined using the off-track capability and/or the track mis-registration of the element.

* * * * *